United States Patent [19]

Russell

[11] Patent Number: 5,057,980

[45] Date of Patent: Oct. 15, 1991

[54] CORNER LIGHTING FIXTURE WITH SELF-CONTAINED JUNCTION BOX

[76] Inventor: James P. Russell, Claridge House II - Apt. 2IW, Verona, N.J. 07044

[21] Appl. No.: 484,822

[22] Filed: Feb. 26, 1990

[51] Int. Cl.$^5$ ............................................... F21S 1/02
[52] U.S. Cl. .................................... 362/147; 362/432; 362/368; 174/64; 220/3.2
[58] Field of Search ............... 362/145, 147, 362, 368, 362/370, 382, 432; 174/50, 54, 61; 220/3.2, 3.3, 3.9, 481

[56] References Cited

U.S. PATENT DOCUMENTS

| | | | |
|---|---|---|---|
| 2,694,137 | 11/1954 | Williams | 362/413 |
| 4,217,629 | 8/1980 | Russell | 362/370 |
| 4,352,151 | 9/1982 | Lewis | 362/147 |
| 4,590,544 | 5/1986 | Decandia | 362/368 |
| 4,894,758 | 1/1990 | O'Toole | 362/368 |

Primary Examiner—Ira S. Lazarus
Assistant Examiner—D. M. Cox
Attorney, Agent, or Firm—Brooks Haidt Haffner & Delahunty

[57] ABSTRACT

Lighting fixture has a self-contained triangular junction box that mounts in the corner of a room or space with the box cover secured as a permanent part of the shade-like lamp housing. The lamp housing has a back panel with a cut-out that slips over the corner mounted junction box, the box cover extending into the housing for registration with the open side of the box when the housing is in place. A single screw joins the box cover to the box and thereby secures the lamp housing thereto.

14 Claims, 6 Drawing Sheets

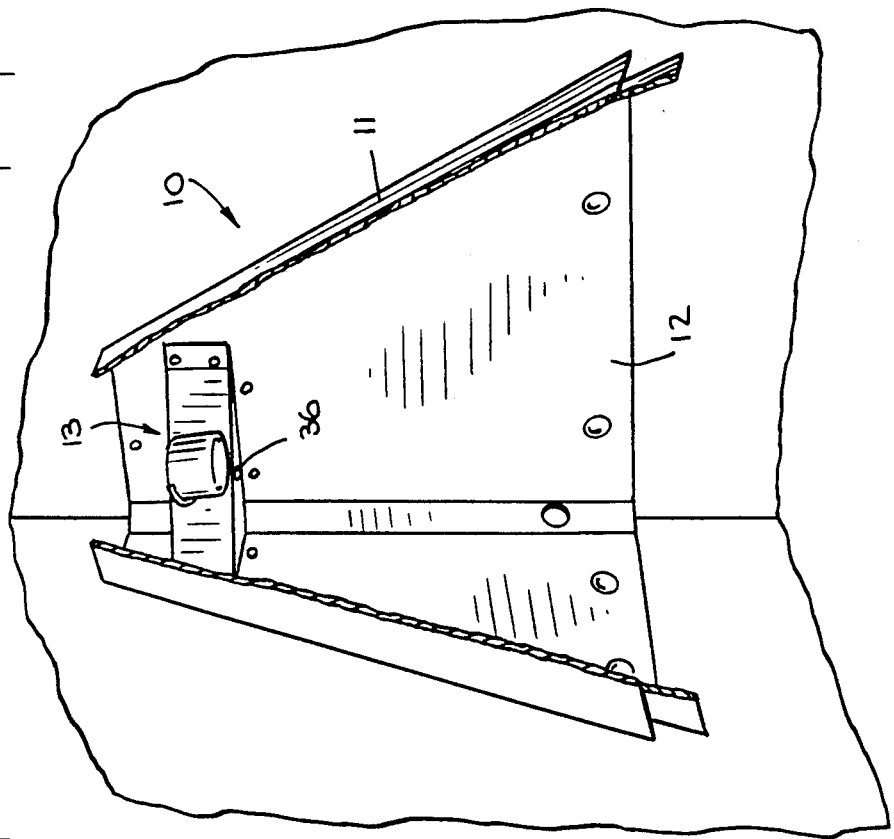
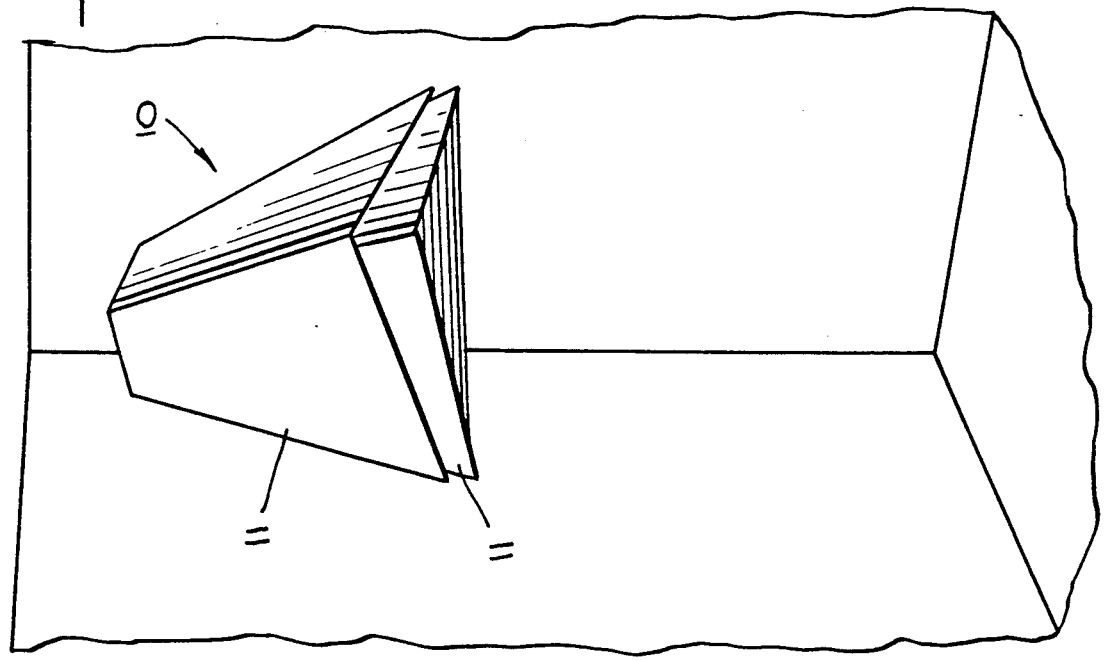

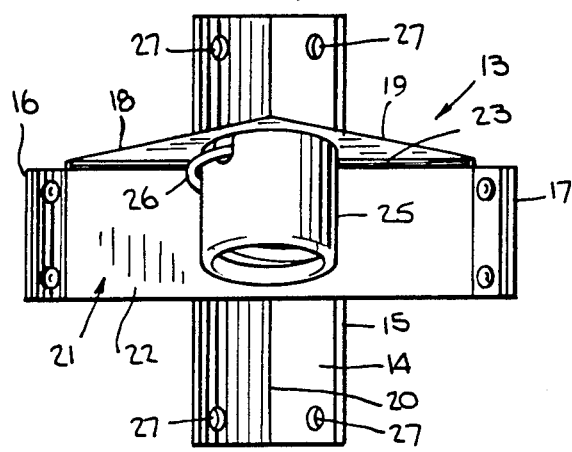
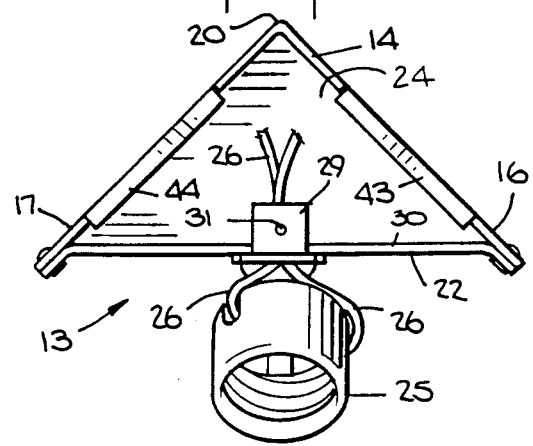
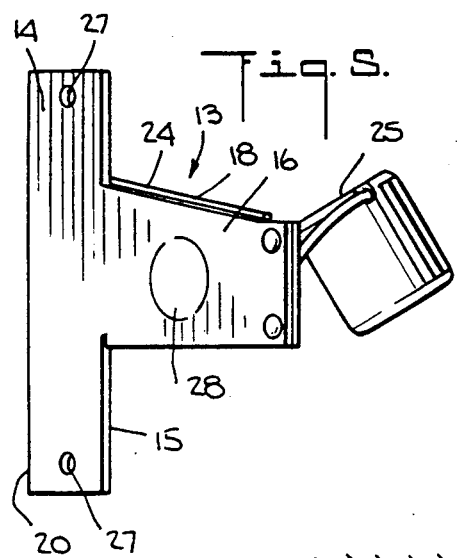
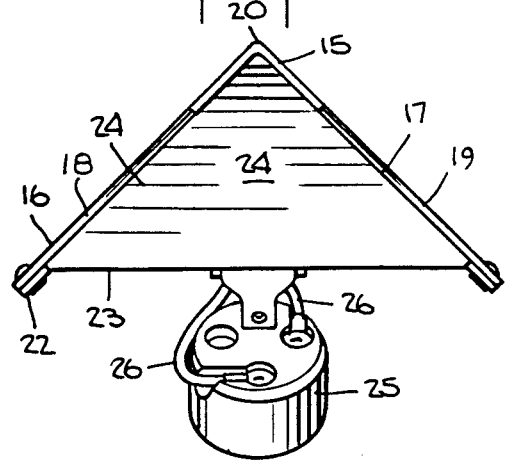
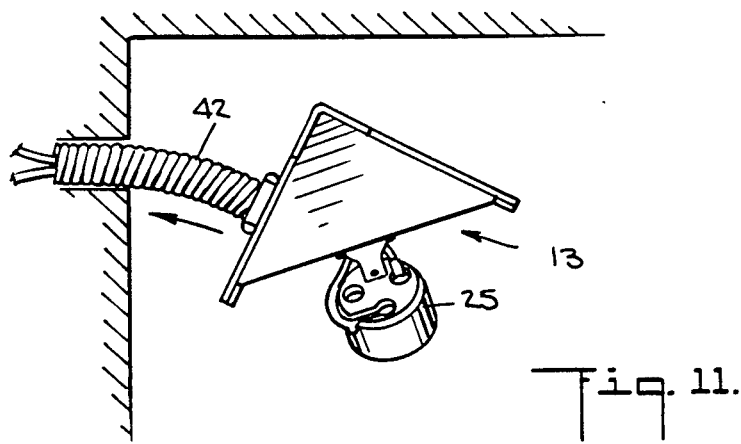

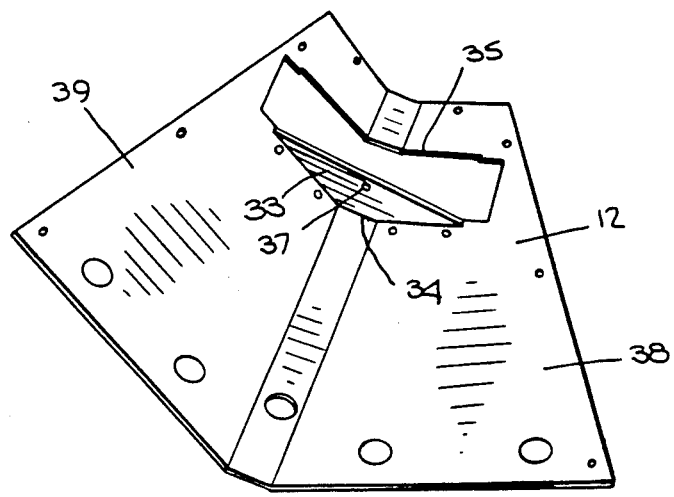
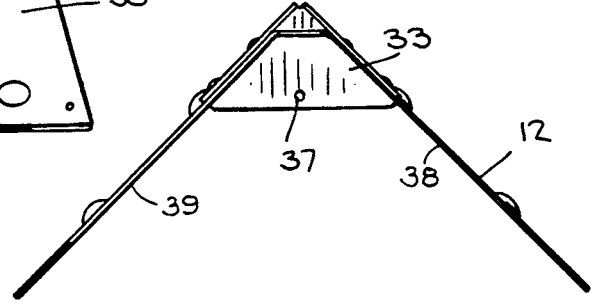
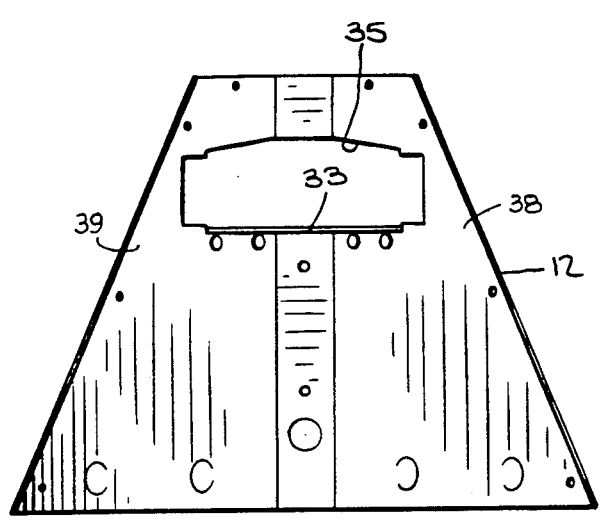
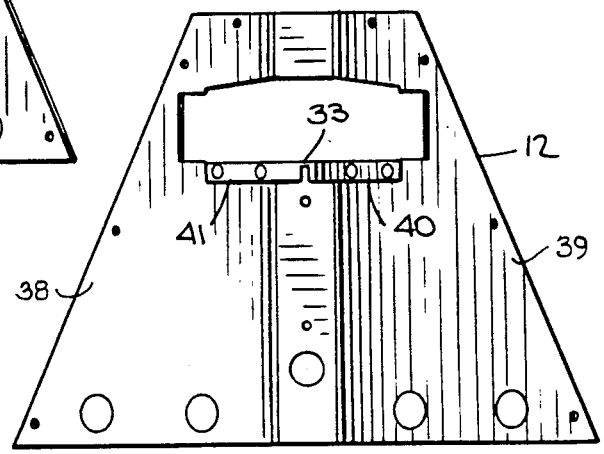

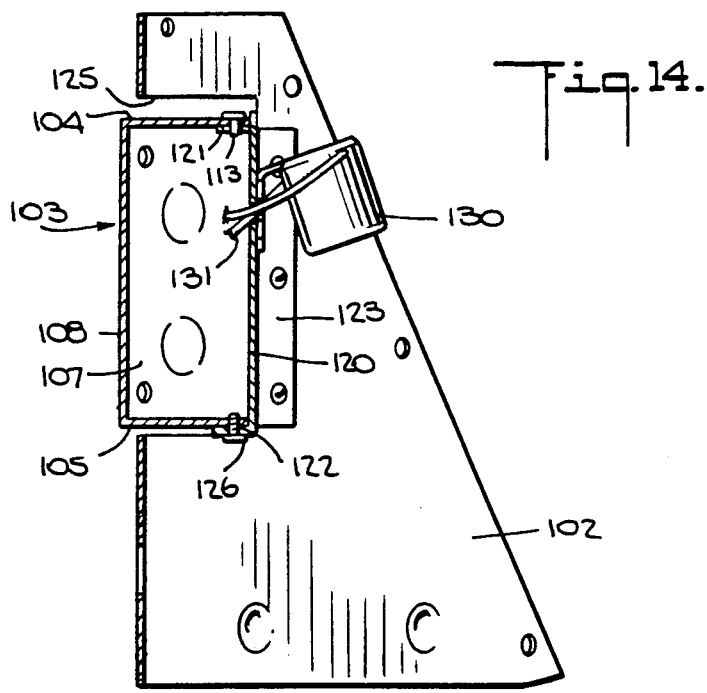
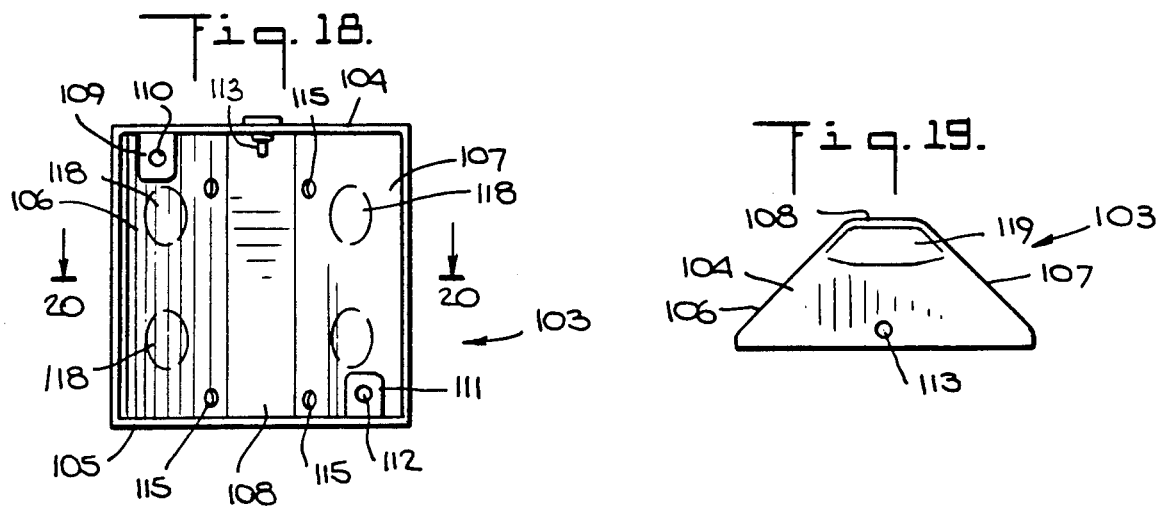
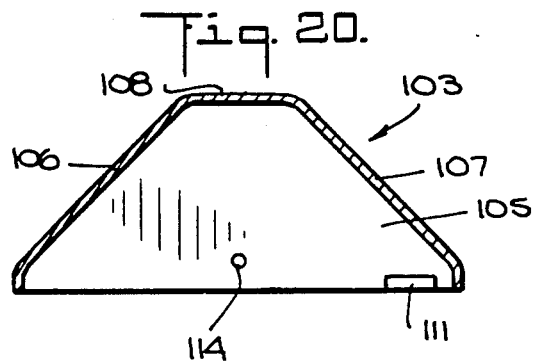

CORNER LIGHTING FIXTURE WITH SELF-CONTAINED JUNCTION BOX

BACKGROUND OF THE INVENTION

The present invention relates to a corner lighting fixture for permanent installation in a corner between two intersecting walls.

In my U.S. Pat. No. 4,217,629, issued Aug. 12, 1980 for a "Corner Lighting Assembly", a portable lamp assembly is described having particular utility providing illumination for fostering plant growth. An object of that invention was to provide a corner lightweight portable lamp assembly that was easily mounted, fit snugly in the corner of a room regardless of irregularities in the adjacent wall surface or corner, was adapted to blend unobtrusively into its surroundings, and provided optimal control and projection of plant growth fostering illumination. To provide mounting flexibility, exposed wiring was employed and concealed behind decorative trim strips.

There are occasions, however, when it is desirable to permanently install lighting fixtures similar in overall outward configuration to those described in my said earlier patent. While numerous patents have been issued for corner lighting fixtures, the patents that have come to my attention, namely 1,900,436; 2,428,827; 2,800,577; 4,246,629; 4,338,653 and 4,352,151, all concentrate on the luminaire and avoid any illustration of the electrical junction box with which the fixture is to be connected. In each instance one must assume that a junction box would be located recessed in the wall with an opening facing into the room and that the fixture would have some means of fastening it either to the junction box or to the surrounding building structure. This often results in a redundancy of structure in that the lighting fixture is usually provided with a chase or wire way where electrical connections are made, and additional connections are made in the built in junction box.

SUMMARY OF THE PRESENT INVENTION

With the foregoing in mind, it is an object of the present invention to provide an arrangement for permanently installing shade-like lamp housings of the general type described in my prior patent.

A further object is to provide for such installation in a manner not requiring a conventional recessed junction box.

A still further object is to provide a lighting fixture having a surface mounted junction box, and a plurality of interchangeable shade-like lamp housings for use therewith.

In accordance with the invention, there is provided a lighting fixture for permanent installation in a corner between two intersecting walls comprising in combination a junction box with rear walls shaped to fit snugly in said corner, means for enabling said junction box to be fastened to said intersecting walls in said corner, entry means on said junction box for admitting electric branch circuit wiring and securing such wiring against separating from said junction box, a screw socket for receiving a bulb, said socket being mounted on another wall of said junction box with wiring passing therethrough into said box for electrical connection to said branch circuit wiring, at least one wall of said junction box other than said rear walls thereof being separable and removable from said junction box to permit access to the interior of said junction box, all of said removable junction box walls being joined to the rear walls of a shade-like lamp housing constructed and arranged with a rear opening for receiving said junction box therethrough, all of said removable junction box walls being located for assembly to said junction box when said lamp housing is positioned over said junction box, means for fastening said removable junction box walls to said junction box for closing said junction box while simultaneously mounting said lamp housing.

BRIEF DESCRIPTION OF THE DRAWINGS

The invention will be better understood after reading the following detailed description of the presently preferred embodiments thereof with reference to the appended drawings in which:

FIG. 1, is a front perspective view of an exemplary corner lighting fixture embodying the present invention and shown mounted in a corner of a room;

FIG. 2, is a view similar to FIG. 1, but with the front decorative panels of the fixture broken away to show the interior construction of a first embodiment of the invention;

FIG. 3, is a front elevational view of the junction box constituting a component part of the fixture of FIGS. 1 and 2;

FIG. 4, is a bottom view of the junction box of FIG. 3;

FIG. 5, is a side elevational view of the junction box of FIG. 3;

FIG. 6, is a top view of the same junction box;

FIG. 7, is a perspective view of the rear panel of the light fixture of FIGS. 1 and 2, before assembly of the front decorative panel and separated from the junction box, for the purpose of more clearly illustrating its construction;

FIG. 8, is a top view of the structure of FIG. 7;

FIG. 9, is a front elevational view of the structure of FIG. 7;

FIG. 10, is a rear elevational view of the structure of FIG. 7;

FIG. 11, is a top view of the junction box of FIGS. 3 to 6, showing it in the process of being installed in a room corner after attaching a branch circuit conduit thereto;

FIG. 14, is a vertical sectional view taken along the line 14—14 in FIG. 12;

FIG. 18, is a front elevational view of the junction box minus its cover as seen in FIG. 13;

FIG. 19, is a top plan view of the junction box in FIG. 18; and

FIG. 20, is a transverse sectional view taken along the line 20—20 in FIG. 18.

The same reference numerals are used throughout the drawings to designate the same or similar parts.

DETAILED DESCRIPTION OF THE PRESENTLY PREFERRED EMBODIMENTS

Figure 12:
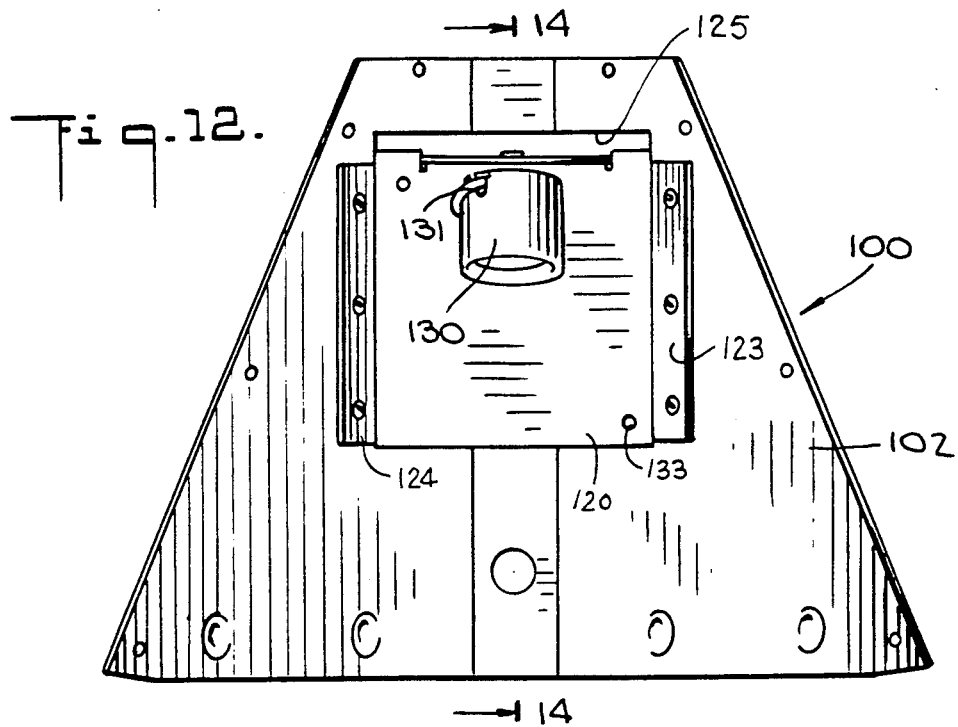
FIG. 12, is a front elevational view of a fixture similar to that shown in FIG. 1, but with the front decorative panels removed to reveal the front of the junction box and the lamp socket of another embodiment of the invention.

Referring to the drawings, and initially to FIGS. 1 to 11, the shade-like lamp housing is designated generally by the numeral 10 and consists essentially of a decorative front panel or panels 11 and a rear panel 12. The front panel 11 can be joined to the side edges of the rear panel either by spot welding or riveting or in any other suitable manner. However, the present invention is directed primarily to the construction of the rear panel 12, the junction box and the relationship therebetween. Before further discussing the panel 12 of the fixture, it will be more convenient to consider the junction box 13 shown in detail in FIGS. 3 to 6.

The junction box 13 is formed from a first panel 14 which if laid flat would resemble a tailless airplane. The panel 14 has a rectangular body 15 and wings 16 and 17 extending to each side of the body 15, the leading edges, 18 and 19, respectively, of the wings 16 and 17, being swept back slightly and the entire panel 14 being folded at right angles along a line 20 bisecting the body 15 in the longitudinal direction. A second panel 21 having a rectangular section 22 joined along its long edge 23 by a fold line to a triangular section 24, is joined to the first panel 14 with the rectangular section 22 joining the outstretched ends of the wings 16 and 17. Here the connection is shown accomplished by riveting, but spot welding could be employed. The triangular section 24 is seen to provide a top wall closure for the resulting truncated right triangular prism.

A screw socket 25 for a bulb is mounted on the rectangular section 22 and extends in front of the junction box 13 angled downwardly as best seen in FIG. 5. The socket 25 is provided with the usual connecting wires 26 that pass through an opening in the section 22 into the interior of junction box 13.

As seen in FIGS. 3 and 5, the body section 15 is provided with a plurality of apertures 27 through which nails or screws can be passed for mounting the box 13 to the walls in a corner. The sides or wings 16 and 17 of the box 13 are provided with one or more knockouts, such as 28 shown in FIG. 5, for receiving a cable or conduit connector in the usual manner.

From FIG. 4 it will be seen that the box 13 is open at the bottom. A tab 29 extends from the lower edge 30 of the rectangular section 22 rearwardly, said tab being provided with a screw threaded aperture 31 for receiving a threaded fastener, shown at 36 in FIG. 2.

For the purpose of completing the junction box there is provided a triangular bottom wall panel 33 that is permanently joined to the rear walls of panel 12 along the lower edge 34 of a cut-out 35. The cut-out 35 is configured to receive the junction box 13 as best seen in FIG. 2, whereupon the screw fastener 36 can be installed through an aperture 37 (see FIG. 7) in triangular panel 33 into the threaded aperture 31 in tab 29. This simultaneously closes the junction box and secures the lamp housing in position against the walls in the corner.

As seen in FIGS. 7 to 10, the rear fixture panel 12 has two truncated triangular side sections 38 and 39, orthogonally related and joined at the rear by a narrow web that provides a slight amount of clearance for general irregularities in the contour of the corner space in which the fixture is to be mounted.

The triangular box panel 33 may be provided with flange extensions 40 and 41, best seen in FIG. 10, whereby the panel 33 is secured by rivets or spot welding to the panel 12. With this construction, one configuration of junction box can be used with a variety of lamp housings in which the front panels 11 change from model to model.

Installation is extremely simple. The branch cable is brought out of the wall in the corner of a room or space at the desired height. A junction box 13 is then connected to the cable 42 in any known manner and then located in the corner as shown schematically in FIG. 11. A few nails through the apertures 27 will secure the junction box in place. Appropriate wire connections to the lamp socket 25 will either already have been made or can be made within the box 13. It is now simply a matter of putting the lamp housing in place and installing the screw 36.

Referring to FIG. 4, the lower edge of wings 16 and 17 may be rolled over at 43 and 44 to provide added strength to wings 16 and 17 and provide a suitable seat for the cover panel 33.

Now turning to FIGS. 12 to 20, there is shown another embodiment of the present invention. As seen therein, the shade-like lamp housing is designated generally by the numeral 100 and consists essentially of a decorative front panel or panels similar to those shown in FIG. 1 but not shown herein, and a rear panel 102. As with the embodiment of FIG. 1, the front panel or panels can be joined to the side edges of the rear panel either by spot welding or riveting or in any other suitable manner.

The junction box for this embodiment is shown in detail in FIGS. 13, 18, 19 and 20, and is designated generally by the reference numeral 103. It is formed in the shape of an isosceles trapezoidal prism having top and bottom walls, 104 and 105, respectively, side walls 106 and 107, related orthogonally and joined at the rear by a back wall 108.

Figure 13:
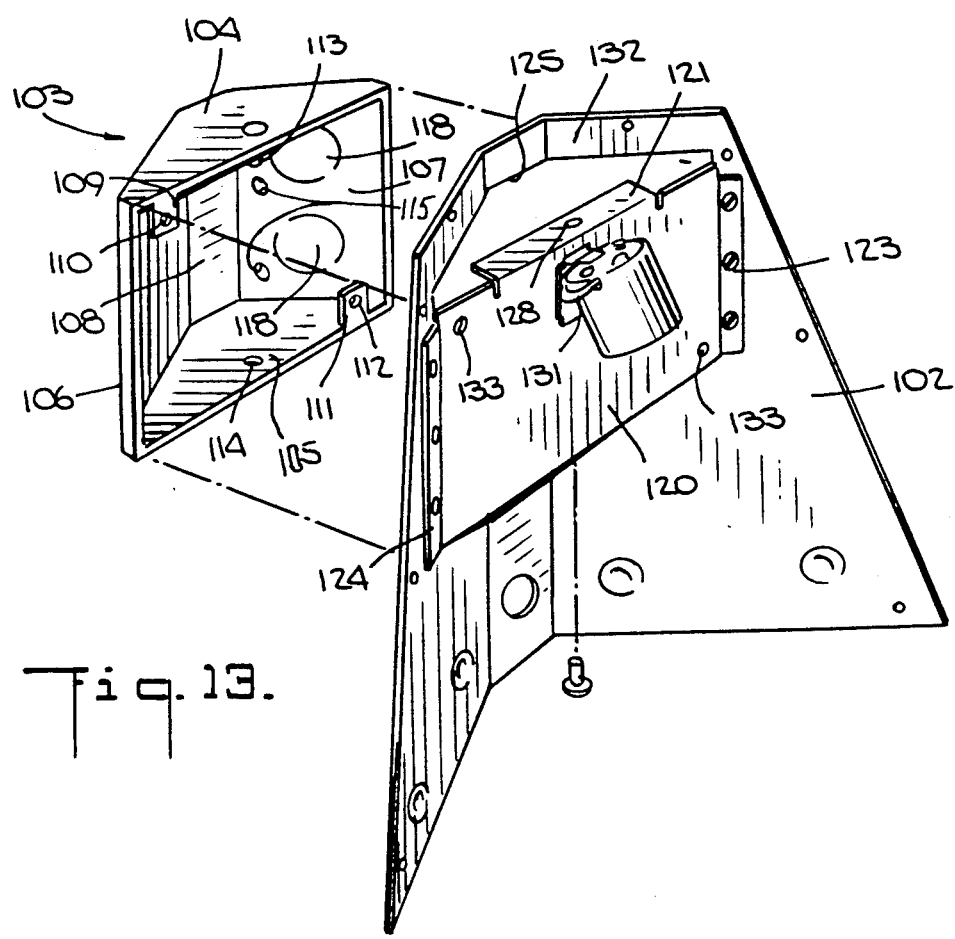
FIG. 13, is an exploded perspective view of the junction box and rear panel of the fixture as seen in the assembly of FIG. 12.
Figure 17:
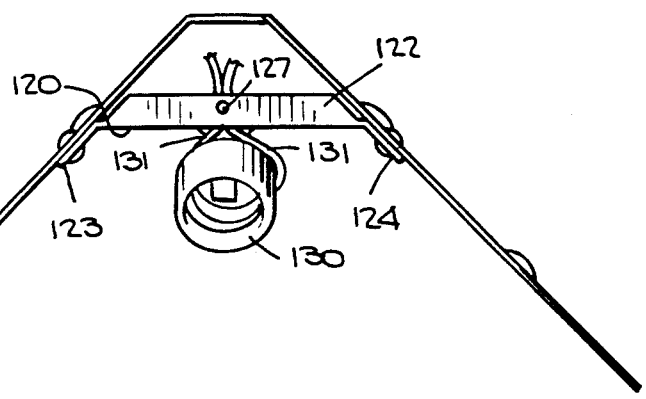
FIGS. 15, 16 and 17, are, respectively, rear elevational, top plan and bottom plan views of the rear panel of the fixture shown in FIG. 13.
Figure 15:
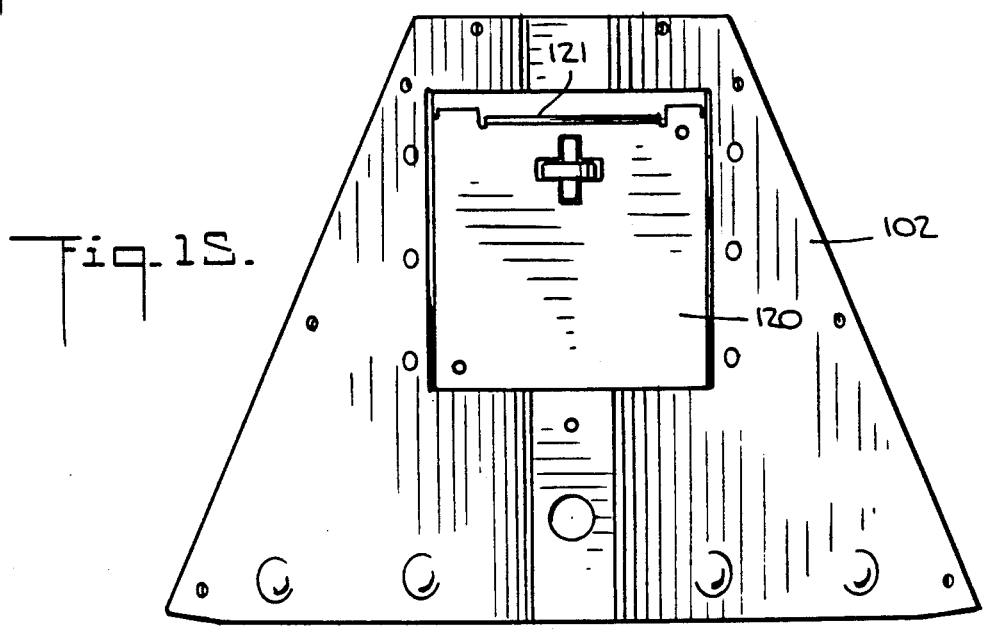
Figure 16:
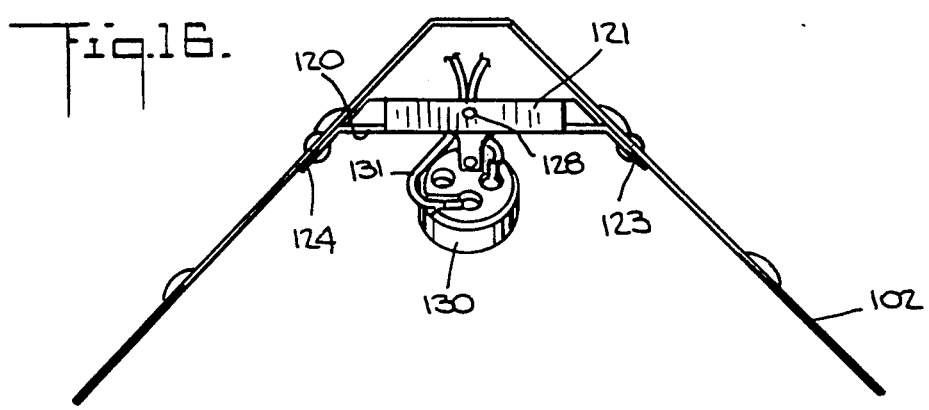

From the drawings it will be seen that the box 103 is open at the front. The top panel 104 has a downwardly depending tab 109 provided with a threaded aperture 110 while the bottom wall 105 has an upwardly extending tab 111 with a threaded aperture 112. Also, the top wall 104 has a stud or pin 113 secured therein toward the open edge of the wall 104 and projecting into the interior of the box. The lower wall 105 is provided with a threaded aperture 114. Also, as seen in FIGS. 13 and 18, the box 103 is provided with a plurality of apertures 115 through which nails or screws can be passed for mounting the box 103 to the room walls in a corner. The sides 106 and 107 of the box 103 are provided with one or more knockouts, such as that shown at 118 in FIG. 18, for receiving a cable or conduit connector in the usual manner. If desired, the top and bottom walls can be provided with a polygonal knockout such as that shown at 119 in FIG. 19. This knockout is of the type to accommodate surface mounting conduit, if desired.

The junction box 103 as described to this point is an open box requiring a cover. The cover is in the form of a substantially rectangular shaped panel 120 having top and bottom rearwardly directed flanges 121 and 122 and side edge flanges 123 and 124. The flanges 123 and 124 are angled from the panel 120 at a 45° angle and serve to join the wall 120 to the rear wall or panel 102 of the fixture. That is, the front wall 120 of the junction box is permanently joined to the rear walls of panel 102 on either side of a cutout 125. The cutout 125 is configured to receive the junction box 103, as best seen in FIG. 14, whereupon a screw fastener 126 (see FIG. 14) can be installed through an aperture 127 in the flange 122 (see FIG. 17) into the threaded aperture 114 in the bottom wall 105 of the junction box. The pin or stud 113 of the junction box is engaged in an aperture 128 in the upper flange 121. With the front wall 120 thus secured to the main body of the junction box 103 the box is simultaneously closed and the lamp housing is secured in position against the walls of the room in the corner.

A screw socket 130 for a bulb is mounted on the rectangular wall 120 and extends in front of the junction box 103 angled downwardly as best seen in FIGS. 13 and 14. The socket 130 is provided with the usual connecting wires 131 that pass through an opening in the wall 120 to the rear thereof for disposition into the interior of junction box 103.

To install the box and fixture shown in FIGS. 12 to 20, a branch cable is brought out of the wall in the corner of a room or space at the desired height as with the first embodiment shown in FIG. 11. The junction box 103 is then connected to the cable 42 in any known manner and then located in the corner in the same way as the box 13 in FIG. 11. A few nails through the apertures 115 will secure the junction box in place. Now the lamp fixture can be hung or suspended temporarily from the box 103 by passing the upper section 132 of the rear panel 102 over and behind the tab 111. With the fixture thus suspended, the wires 131 can be connected within the junction box 103 to the incoming wires from cable 42 in the usual manner. Thereupon, the opening 125 in the fixture can be fitted over the junction box 103 with the pin 113 being engaged in aperture 128 and the screw fastener 126 being inserted. Alternatively, or as a supplemental fastening, screws can be passed through the front apertures 133 in the wall 120 into the apertures 110 and 112 in the tabs 109 and 111.

As clearly seen in FIG. 14, the junction box 103 has a height substantially equal to the distance between the flanges 121 and 122 such that the top and bottom walls 104 and 105 of the junction box, when assembled to the removable wall 120, overlie the flanges 121 and 122, as shown.

Having described the invention with reference to the presently preferred embodiments thereof, it will be apparent to those skilled in the subject art that numerous changes in construction and detail can be introduced without departing from the true spirit of the invention as defined in the appended claims.

What is claimed is:

1. A lighting fixture for permanent installation in a corner of a room between two intersecting walls comprising in combination a junction box with rear walls shaped to fit snugly in said corner while positioning the junction box symmetrically about the corner bisecting plane, means for enabling said junction box to be fastened symmetrically about said bisecting plane to said intersecting walls in said corner, entry means on said junction box for admitting electric branch circuit wiring and securing such wiring against separating from said junction box, a screw socket for receiving a bulb, said socket being mounted on another wall of said junction box with wiring passing therethrough into said box for electrical connection to said branch circuit wiring, at least one wall of said junction box other than said rear walls thereof being separable and removable from said junction box to permit access to the interior of said junction box, all of said removable junction box walls being joined to the rear walls of a shade-like lamp housing constructed and arranged with a rear opening for receiving said junction box therethrough, all of said removable junction box walls being located for assembly to said junction box when said lamp housing is positioned over said junction box, means for fastening said removable junction box walls to said junction box for closing said junction box while simultaneously mounting said lamp housing.

2. A lighting fixture according to claim 1, wherein said junction box is in the form of a truncated triangular prism.

3. A lighting fixture according to claim 2, wherein all of said removable junction box walls are triangular shaped.

4. A lighting fixture according to claim 3, wherein said lamp housing has rear walls that extend forward diverging from a rearward position at an angle of 90° until they merge into a decorative front panel.

5. A lighting fixture according to claim 3, wherein said at least one removable junction box wall is the bottom wall of the junction box.

6. A lighting fixture according to claim 1, wherein said junction box comprises a first panel resembling an airplane with a rectangular body and wings extending to each side of the body, the leading edges of the wings being swept back slightly and the entire panel being folded at right angles along a line bisecting the body in the longitudinal direction, and a second panel having a rectangular section joined along its long edge by a fold line to a triangular section, said second panel being joined to said first panel with said rectangular section joining the outstretched ends of said wings, and said triangular section providing a top wall closure for the resulting truncated triangular prism.

7. A lighting fixture according to claim 6, wherein said screw socket is mounted on said rectangular section to extend in front thereof.

8. A lighting fixture according to claim 6, wherein a tab extends from the lower edge of said rectangular section rearwardly, said tab being provided with a screw threaded aperture for receiving a threaded fastener, and said means for fastening said removable junction box wall comprises a threaded fastener arranged to pass through said removable wall and threadedly engage said tab aperture.

9. A lighting fixture according to claim 1, wherein said junction box is in the form of an isosceles trapezoidal prism.

10. A lighting fixture according to claim 9 wherein said at least one removable junction box wall is substantially rectangular shaped.

11. A lighting fixture according to claim 10, wherein said lamp housing has rear walls that extend forward diverging from a rearward position at an angle of 90° until they merge into a decorative front panel.

12. A lighting fixture according to claim 10, wherein said at least one removable junction box wall is the front wall of the junction box.

13. A lighting fixture according to claim 12, wherein said screw socket is mounted on said at least one removable junction box wall to extend in front thereof.

14. A lighting fixture according to claim 13, wherein said at least one removable junction box wall has a rearwardly extending flange along top and bottom edges, an aperture through both said flanges, and said junction box has top and bottom walls and a height substantially equal to the distance between said flanges such that said top and bottom walls of said junction box, when assembled to said at least one removable wall, overlie said flanges, and separate means for passing through said respective apertures in said flanges and engaging, respectively, said top and bottom walls to secure said removable wall to said junction box.

* * * * *